R. C. NOLL.
TIRE CHAIN.
APPLICATION FILED FEB. 24, 1917.
1,254,154.
Patented Jan. 22, 1918.
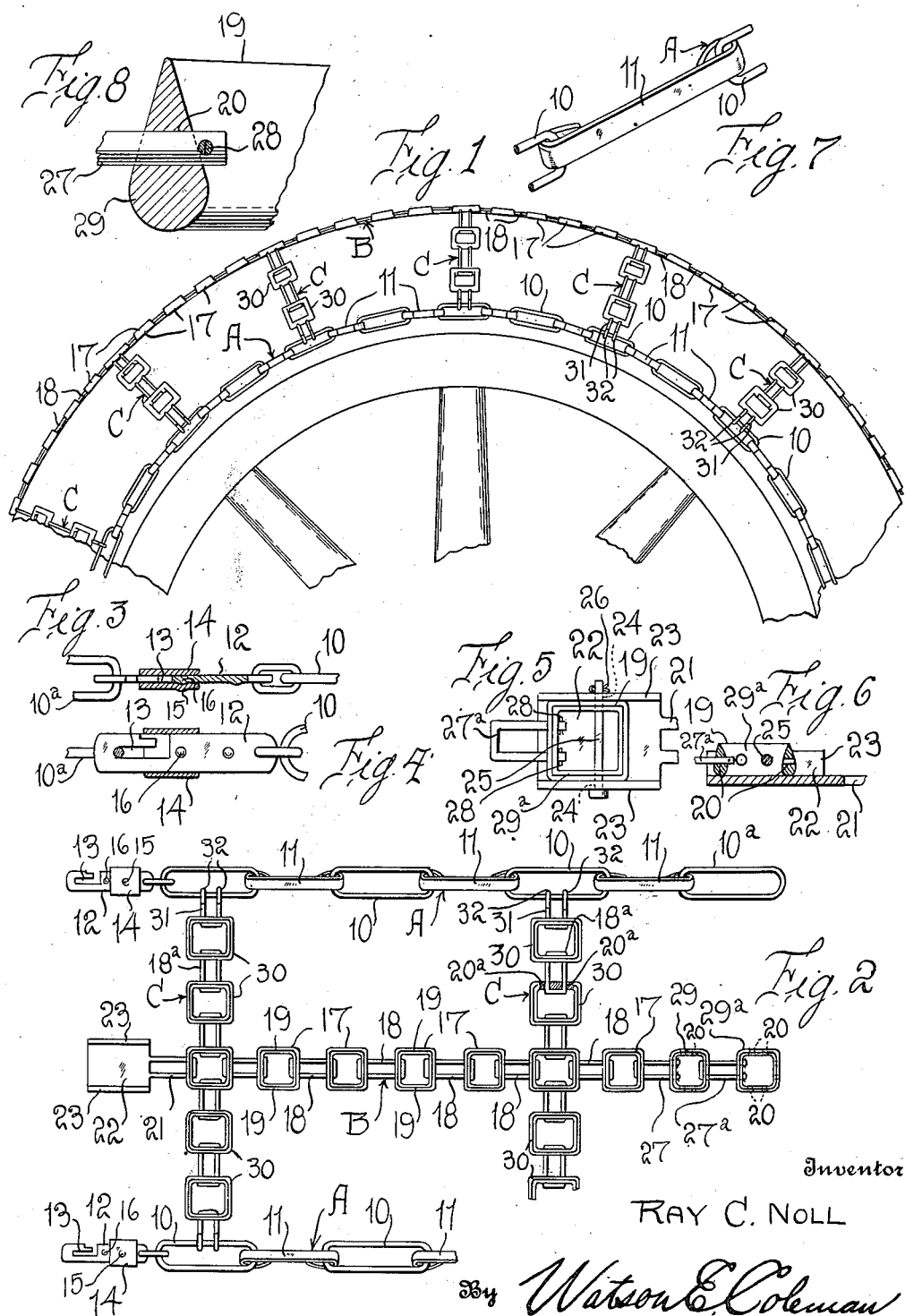
Inventor
RAY C. NOLL
By Watson E. Coleman
Attorney

UNITED STATES PATENT OFFICE.

RAY C. NOLL, OF PLEASANT GAP, PENNSYLVANIA.

TIRE-CHAIN.

1,254,154.　　　　　Specification of Letters Patent.　　Patented Jan. 22, 1918.

Application filed February 24, 1917. Serial No. 150,758.

*To all whom it may concern:*

Be it known that I, RAY C. NOLL, citizen of the United States, residing at Pleasant Gap, in the county of Center and State of Pennsylvania, have invented certain new and useful Improvements in Tire-Chains, of which the following is a specification, reference being had to the accompanying drawings.

This invention relates to tire chains such as are used on automobile wheels for the purpose of preventing slipping and skidding.

The general object of my invention is the provision of a tire chain which is particularly efficient in operation, which is simply constructed and to which repairs may be readily made.

A further object is to provide a fastener or connecting device for the ends of the tire chain which cannot come open or be disconnected by accident.

A further object is to provide means whereby broken links in the side chains may be easily replaced.

Still another object is to provide a tire chain composed of longitudinal chains and cross chains, the cross chains being so formed as to prevent side skidding and slipping of the wheels, and a further object is to provide in connection with the side chains and cross chains a longitudinally or medially disposed chain which adds greatly to the smoothness of the riding, reinforces the cross chains and distributes the strain on the structure more evenly.

Still another object is to provide a "quick repair" connector whereby any broken links in the cross chains or medial chain may be readily replaced thus doing away with the necessity of buying new cross chains whenever a link is broken.

A further object is to provide a connecting link for the side chains which may be readily replaced when broken.

Other objects will appear in the course of the following description.

The invention is illustrated in the accompanying drawings, in which:

Figure 1 is an elevation of a portion of a wheel and tire with my anti-skid chain applied thereto;

Fig. 2 is a fragmentary top plan view of the chain;

Fig. 3 is a sectional view of the fastening device for connecting the ends of the side chains;

Fig. 4 is an elevation of the construction shown in Fig. 3, the slide 14 being in section;

Fig. 5 is a top plan view of the means for connecting the medial chain;

Fig. 6 is a longitudinal sectional view thereof;

Fig. 7 is a fragmentary perspective view of one of the side chains; and

Fig. 8 is an enlarged sectional view of one of the links 19.

Referring to these drawings, it will be seen that my improved tire chain consists of two side chains, designated generally A, a medially disposed chain extending parallel to the side chains and designated B, and a plurality of cross chains designated C and disposed at uniform distances along the side and medial chains.

The side chains consist of a plurality of closed links 10 of ordinary construction and connecting links 11, which are made of flat pieces of steel about $\frac{3}{8}''$ wide and $\frac{1}{8}''$ thick, the ends of these flat links 11 being bent over around the ends of the links 10 to thus join the two links. These connecting links 11 may be easily put in place and the ends bent down so that these flat links 11 provide for a ready means of substituting a new link for an old link in case the side chains are broken. At one end each side chain is provided with a link 10ª of the same construction as the link 10 and at the other end the side chains are provided with a connecting hook 12, which is formed of a relatively thin strip of metal having an opening at one end for the passage of the link 10 and at its other end formed with a hook shaped recess 13 which is adapted to hook over the link 10ª. A sliding keeper 14 is mounted upon the shank of the member 12, this keeper being held in its operative position by forming the keeper with a recess 15 adapted to snap into engagement with a boss 16 formed on the link when the slide is shifted to its closed position.

The medial chain B is formed of a plurality of approximately square links 17 and somewhat oblong connecting links 18. The links 17, as illustrated most clearly in Fig. 8 are from $\frac{1}{2}''$ to $\frac{5}{8}''$ thick according to the size of the chain and from ¾" to 1¼" square, also according to the size of the chain. The bars of the link are rounded off upon that side which faces the tire and the body of the bars is tapered outwardly so as to provide a sharp edge 19. The opposite side of each link 17 is formed with a pair of perforations 20 through which the side bars of the link 18 pass. The links 18 are made of 3/16" steel wire formed in a rectangular shape and the ends of the wire are preferably welded together. It will be seen that these links 18 do not come in contact with the ground but are disposed in a plane approximately midway between the inner face of each link 17 and the outer edge thereof. The link 17 at one end of the medial chain B is operatively connected to a loop 21 which in turn is operatively connected to a fastener 22 which is formed of a plate of steel having upwardly turned side flanges 23 formed with holes 24 for the passage of a pin 25, this pin being headed at one end and at the other end being formed with an opening for the passage of a cotter pin 26. At its opposite end the medial chain B is provided with what I term quick connecting links, which are designated 27 and 27$^a$. Each link, as illustrated in Figs. 2 and 5, is U shaped in form, open at one end, and is provided with apertures through which cotter pins 28 may pass. The arms of the link 27 are passed through the openings 20 of the end links 17 and then pass through openings in a square link 29, which has practically the same form as the link 17 but is formed in its side bars, as well as its end bars, with the openings 20. The legs of the link 27 are passed through the openings in the adjacent end bar of the link 29 and then the cotter pins are inserted to prevent the links being disconnected. A like link 27$^a$ is connected to the other end bar of link 29 and has its legs passed through a link 29$^a$ which is of the same form as the link 29. The links 27$^a$ and 29$^a$ may or may not be used, as desired, depending upon whether it is necessary to increase the length of the medial chain or not. Links of the same character as link 27 may be used in any position as repair links in place of the links 18. When it is desired to connect the ends of the medial chain, the link 29$^a$ is disposed within the trough shaped member 22 between the sides thereof and then the pin 25 is passed through the openings 24 and through the openings 20 in the side bars of the link 29$^a$.

The transversely extending chains C are composed of square links 30 which are constructed in the same manner as the links 17. These links are connected by links 18$^a$ which are of the same construction as the links 18 and used in the same manner. The end links of each cross chain are connected to the links 10 of the side chains by means of U-shaped links 31, the extremities of which are bent over to form loops 32 embracing the side bars of the links 10.

It will be, of course, understood that the side chains A are less in length than the medial chain B. For a 34—4" tire the length of the side chains will be 90" and the length of the medial chain 107".

It will be seen that the fastener for engaging the ends of the side chains cannot come open accidentally and thus prevents any accidental detachment of the chain. It will further be seen that with this type of side chains, broken links may be easily replaced and repaired.

By providing the cross chains C, side skidding, it has been found by actual tests, is entirely prevented and a slippage of the wheels is also prevented, thus giving thoroughly good traction even on slippery pavements and insuring the safety of the passengers and car. The provision of the medial chain B adds greatly to the smoothness of the riding, reinforces the cross chains and distributes the strain evenly and, of course, assists the cross chains in preventing skidding. Furthermore the shape of the links 17 and 30 is such as to secure thoroughly good traction and secure a relatively large area of contact with the surface. The quick repair link 27 provides for an easy replacement of any links which may be broken. This is not possible with the chains now in use and it is obvious that the quick repair link can be used not only with the longitudinal links but with the cross links. By providing the links 29 and 29$^a$, it is possible to replace any of the links 30 or 17 which may be broken and it is to be noted that the loose end of the middle chain is made up of the links 29 and 29$^a$ and the quick connectors 27 so that a link may be readily taken out and thus secure a good fit or adjustment.

Attention is called to the cross sectional shape of the links 19, 17, and 30. It will be seen that these links have relatively sharp corners on those portions which touch the ground and, furthermore, that a relatively large gripping surface is provided which resists lateral sliding action and any longitudinal sliding action. These links act in a general way as the calk of a horse-shoe acts in securing firm engagement with the ground. The medial chain B adds to the smoothness of the riding, thus with it, the surface that touches the ground is absolutely uniform all the way around the tread, thus eliminating all bumping or rough-riding caused by the cross chains extending across the tread. These cross chains are about one-half inch thick and are six and seven inches apart in ordinary tire chains and every time a cross chain touches the ground, it acts to lift the machine.

On the tread chain or medial chain, it is desirable to provide a fastening device which will not become worn and it is to this end that I provide the U-shaped member 22 to receive the link 29 or 29ª, the flanges on this member 22 prevent the fastening pins from touching the ground.

Having thus described my invention, what I claim is:—

1. A chain element made up of links and means for connecting the ends of the chain element comprising a link at one end of the chain having side bars and end bars, the side bars being formed with transversely extending perforations and a connecting member at the other end of the chain, trough shaped in form and having perforations in its lateral flanges adapted to be registered with the perforations in the side bars of the end link, a pin adapted to be disposed through said perforations of the connecting member and the link, and means for holding the pin against accidental detachment.

2. The combination with a grip tread for tire chains comprising open-centered tread members, having oppositely disposed pairs of perforations extending parallel to the plane of the face of the tread member, of a connecting member U-shaped in form to provide legs adapted to be passed through the perforations in the tread member, the ends of the legs being perforated for the passage of cotter pins.

3. A chain composed of open centered tread elements, and links connecting said tread elements having sliding engagement with the tread elements and permitting the movement of the tread elements toward or from each other.

4. In a chain, tread elements open centered and having end bars and side bars, and means connecting said tread elements comprising links having legs passing loosely through passages in the bars of the tread elements.

In testimony whereof I hereunto affix my signature in the presence of two witnesses.

RAY C. NOLL.

Witnesses:
JAMES C. FAUST,
WM. H. NOLL, Jr.